United States Patent [19]

Yamaguchi et al.

[11] Patent Number: 5,439,962
[45] Date of Patent: Aug. 8, 1995

[54] ORGANOPOLYSILOXANE COMPOSITION

[75] Inventors: Hiromasa Yamaguchi, Annaka; Yasushi Yamamoto, Takasaki; Hirofumi Kishita, Annaka, all of Japan

[73] Assignee: Shin-Etsu Chemical Co., Ltd., Japan

[21] Appl. No.: 258,928

[22] Filed: Jun. 13, 1994

[30] Foreign Application Priority Data

Jun. 17, 1993 [JP] Japan .................. 5-171049

[51] Int. Cl.$^6$ .................................. C08K 5/54
[52] U.S. Cl. .................. 524/267; 525/477; 106/287.14
[58] Field of Search .................. 528/42; 525/477; 524/267; 106/287.14

[56] References Cited

U.S. PATENT DOCUMENTS 4,594,004 10/1985 von Au et al. .................. 528/42
5,349,037 9/1994 Fujiki et al. .................. 528/42

*Primary Examiner*—Melvyn I. Marquis
*Attorney, Agent, or Firm*—Wenderoth, Lind & Ponack

[57] ABSTRACT

The organopolysiloxane composition proposed is a blend of a conventional diorganopolysiloxane or a dimethylpolysiloxane oil and a limited amount of an (etherified) perfluoroalkyl group-containing organopolysiloxane such as those represented by the general formula $$(R_fY)_c R_{3-c}Si-O+SiR(YR_f)-O \!+\!_a\! +\! SiR_2-O \!+\!_b\! SiR_{3-d}(YR_f)_d$$

in which $R_f$ is a perfluoroalkyl group of 1 to 14 carbon atoms or an etherified perfluoroalkyl group of 2 to 14 carbon atoms having at least one oxygen atom between two carbon atoms forming an ether linkage, R is a hydrogen atom or a monovalent hydrocarbon group having 1 to 10 carbon atoms, Y is a divalent organic group having 2 to 5 carbon atoms, the subscripts a and b are, each independently from the other, zero or a positive integer and the subscripts c and d are, each independently from the other, zero, 1, 2 or 3 with the proviso that at least one of the subscripts a, c and d is not zero. By virtue of the admixture of this unique adjuvant, the silicone oil composition can be imparted with greatly increased spreadability even on the surface of a fluorocarbon resin film although the surface tension of the oil is not remarkably decreased thereby.

4 Claims, No Drawings

ORGANOPOLYSILOXANE COMPOSITION

BACKGROUND OF THE INVENTION

The present invention relates to an organopolysiloxane composition or, more particularly, to an organopolysiloxane composition comprising a fluorocarbon group-containing organopolysiloxane having a remarkably low surface energy and exhibiting excellent wettability and lubricity against various materials.

As is well known, liquid organopolysiloxanes or so-called silicone oils have excellent heat and cold resistance, electric properties, water resistance and chemical resistance so that they are useful in a wide field of applications. One of the most unique properties of silicone oils is their very low surface tension as compared with other liquids including water and various kinds of natural and synthetic oils so that silicone oils can easily spread over the surface of a variety of materials. This unique property of silicone oils is utilized in their applications as surface-release agents, antifoam agents and additives in cosmetic and toiletry compositions.

Certain fluorocarbon polymers such as polytetrafluoroethylene, however, have a still lower surface energy than conventional silicone oils so that the surface of such a resin cannot be coated with a silicone oil with full evenness or exhibits repellency against silicone oils. This means, for example, that silicone oils are not always suitable as a release agent on the surface of an article made from a fluorocarbon resin.

In order to solve the above mentioned problem, proposals have been made heretofore according to which a silicone oil is admixed with a fluorinated hydrocarbon compound or a fluorine-containing surface active agent. This method, however, is not quite satisfactory because of the low compatibility of these fluorine-containing compounds in general with silicone oils resulting in eventual phase separation of the blend not to sustainedly exhibit the desired effects with uniformity.

SUMMARY OF THE INVENTION

The present invention accordingly has an object to provide a novel organopolysiloxane composition or a composite silicone oil improved in respect of wettability or spreadability over various substrate materials so as to be applied to the surface of any materials having an extremely low surface energy such as polytetrafluoroethylene resins with uniformity and stability.

Thus, the organopolysiloxane composition provided by the present invention is a uniform blend which comprises:

(a) 100 parts by weight of a first organopolysiloxane which is a diorganopolysiloxane represented by the general formula $$R^1\text{-}(SiR_2\text{-}O)_n\text{-}SiR_2\text{-}R^1, \quad (I)$$

in which R is a hydrogen atom or a monovalent hydrocarbon group having 1 to 10 carbon atoms, $R^1$ is a hydroxy group or the same group as R and the subscript n is a positive integer, and having a viscosity not exceeding 100,000 centistokes at 25° C.; and (b) from 0.5 to 50 parts by weight or, preferably, from 1 to 20 parts by weight of a second organopolysiloxane selected from the group consisting of (b1) a linear diorganopolysiloxane represented by the general formula

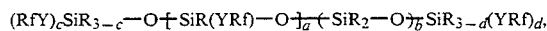

$$(RfY)_cSiR_{3-c}\text{-}O\text{-}(SiR(YRf)\text{-}O)_a\text{-}(SiR_2\text{-}O)_b\text{-}SiR_{3-d}(YRf)_d, \quad (II)$$

in which R has the same meaning as defined above, Rf is a perfluoroalkyl group of 1 to 14 carbon atoms or an etherified perfluoroalkyl group of 2 to 14 carbon atoms having at least one oxygen atom between two carbon atoms forming an ether linkage, Y is a divalent organic group or, in particular, hydrocarbon group having 2 to 5 carbon atoms, the subscripts a and b are, each independently from the other, zero or a positive integer and the subscripts c and d are, each independently from the other, zero, 1, 2 or 3 with the proviso that at least one of the subscripts a, c and d is not zero;

(b2) a cyclic diorganopolysiloxane represented by the general formula

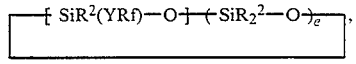

$$[\text{-}SiR^2(YRf)\text{-}O\text{-}]_f[\text{-}SiR_2^2\text{-}O\text{-}]_e, \quad (III)$$

in which Rf and Y each have the same meaning as defined above, each $R^2$ is, independently from the others, an alkyl group having 1 to 4 carbon atoms or an aryl group and the subscript e is a positive integer of 2 or larger;

(b3) a tris(siloxy) silane compound represented by the general formula

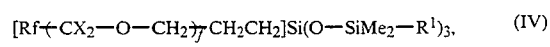

$$[Rf\text{-}(CX_2\text{-}O\text{-}CH_2)_f\text{-}CH_2CH_2]Si(O\text{-}SiMe_2\text{-}R^1)_3, \quad (IV)$$

in which Rf and $R^1$ each have the same meaning as defined above, Me is a methyl group, X is a hydrogen atom or a fluorine atom and the subscript f is zero or 1; and (b4) an oxyalkylene group-containing organopolysiloxane represented by the general formula

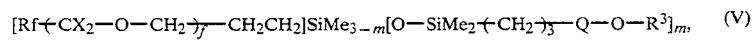

$$[Rf\text{-}(CX_2\text{-}O\text{-}CH_2)_f\text{-}CH_2CH_2]SiMe_{3-m}[O\text{-}SiMe_2\text{-}(CH_2)_3\text{-}Q\text{-}O\text{-}R^3]_m, \quad (V)$$

in which Rf, X, f and Me each have the same meaning as defined above, $R^3$ is a hydrogen atom, an alkyl group having 1 to 4 carbon atoms or an acyl group having 2 or 3 carbon atoms, Q is a (poly)oxyalkylene group and the subscript m is 1, 2 or 3.

DETAILED DESCRIPTION OF THE PREFERRED EMBODIMENTS

As is described above, the inventive organopolysiloxane composition is a uniform blend of two types of distinguishable organopolysiloxanes (a) and (b) defined above in a specified proportion. The first organopolysiloxane, i.e. component (a), is a diorganopolysiloxane having a linear molecular structure as represented by the general formula (I). In the formula, R is a hydrogen atom or a monovalent hydrocarbon group having 1 to 10 carbon atoms exemplified by alkyl groups such as methyl, ethyl, propyl and butyl groups, cycloalkyl groups such as cyclohexyl group, alkenyl groups such as vinyl and allyl groups, aryl groups such as phenyl and tolyl groups and aralkyl groups such as benzyl and 2-phenylethyl groups or, preferably, a methyl group. The hydrocarbon group denoted by R can optionally be substituted by certain reactive functional groups such as amino, (2-aminoethyl)amino, epoxy, carboxyl, methacryloxy and mercapto groups as well as by conventional substituent atoms or groups for a part or all of the hydrogen atoms. It should be noted that two or more hydrogen atoms are never bonded to one and the same silicon atom. $R^1$ in the formula can be the same as R defined above or can be a hydroxy group. The subscript n, which is a positive integer, gives the degree of polymerization or is a determinant of the viscosity of the organopolysiloxane which should be 100,000 centistokes or lower or, preferably in the range from 50 to 10,000 centistokes at 25° C. depending on the particular application of the inventive composition. When the viscosity of the first organopolysiloxane as the component (a) is too high, the miscibility thereof with the second organopolysiloxane as the component (b) would be decreased so as to cause eventual phase separation by standing the composition as a blend or the spreadability of the composition over the surface of certain substrates may be decreased. Though dependent on the particular application of the composition, it is desirable that the organopolysiloxane as the component (a) is as free as possible from low molecular species having a molecular weight of, for example, 5000 or smaller. In particular, the content of cyclic organopolysiloxanes having a molecular weight smaller than 3000 is desirably 500 ppm or lower.

The second organopolysiloxane as the component (b) to be blended with the first organopolysiloxane as the component (a) to exhibit an effect as a spreadability-improver of the composition is selected from four classes of differently defined organopolysiloxanes (b1) to (b4) having at least one perfluoroalkyl group or etherified perfluoroalkyl group bonded to a silicon atom through a divalent group Y as described above. These four classes of organopolysiloxanes can be used either singly or as a combination of two kinds or more of different classes according to need.

The organopolysiloxane of the first class as the component (b), i.e. component (b1), is a linear diorganopolysiloxane represented by the general formula (II) given above. Characteristically, the organopolysiloxane (b1) contains at least one perfluoroalkyl group or etherified perfluoroalkyl group Rf bonded to the silicon atom through a divalent organic group denoted by Y. Namely, in the general formula (II), R has the same meaning as defined for the general formula (I) or, preferably, a methyl group and Rf is a perfluoroalkyl group of 1 to 14 carbon atoms or an etherified perfluoroalkyl group of 2 to 14 carbon atoms having one or more of oxygen atoms each between two carbon atoms forming an ether linkage. The perfluoroalkyl group is represented by the general formula $C_kF_{2k+1}$, in which k is a positive integer of 1 to 14. An example of the etherified perfluoroalkyl group having one or more ether linkages is that expressed by the formula F—(CF(CF$_3$)—CF$_2$—O)$_s$(C$_2$F$_4$)$_t$, in which s is a positive integer and t is zero or a positive integer with the proviso that $3s+2t$ does not exceed 14. The linking group denoted by Y is a divalent organic group or divalent hydrocarbon group, e.g., alkylene group, having 2 to 5 carbon atoms, optionally, with one or more of oxygen atoms each between two carbon atoms forming an ether linkage. Examples of the divalent group denoted by Y include those expressed by the formulas: —CH$_2$CH$_2$—, —CH$_2$CH$_2$CH$_2$—, —CH$_2$—O—CH$_2$CH$_2$CH$_2$—, —CH(CH$_3$)— and —CH(CH$_3$)—CH$_2$—. The subscripts a and b in the general formula (II) are each zero or a positive integer and the subscripts c and d are each zero, 1, 2 or 3 with the proviso that at least either one of a, c and d is not zero. This limitation means that the organopolysiloxane (b1) has at least one perfluoroalkyl group or etherified perfluoroalkyl group Rf bonded to a silicon atom either at a molecular chain end or at an intermediate position of the molecular chain. It is preferable, however, that these subscripts a to d each have such a value that the content of fluorine in the organopolysiloxane (b1) is at least 10% by weight. The sum of $a+b$, which defines the degree of polymerization of the organopolysiloxane (b1), should have a value of 1 to 100 so that the organopolysiloxane (b1) has a viscosity in the range from 1 to 300 centistokes at 25° C. .

Examples of fluorine-containing diorganopolysiloxanes suitable as the component (b1) include, though not particularly limitative thereto, those expressed by the following structural formulas:

$C_8F_{17}CH_2CH_2SiMe_2$—O—(SiMe$_2$O)$_3$SiMe$_3$,

Me$_3$SiO—(SiMe(CH$_2$CH$_2$C$_8$F$_{17}$)—O)$_2$—(SiMe$_2$O)$_3$SiMe$_3$;

Me$_3$SiO—(SiMe(CH$_2$CH$_2$CH$_2$OCH$_2$Rf$^1$)—O)$_2$—(SiMe$_2$O)$_3$SiMe$_3$;

$C_8H_{17}$—SiMe$_2$—O—SiMe(CH$_2$CH$_2$C$_8$F$_{17}$)—O—SiMe$_2$—C$_8$H$_{17}$; and Me$_3$SiO—SiMe(CH$_2$CH$_2$C$_8$F$_{17}$)—O—SiMe$_3$, in which Me is a methyl group and Rf$^1$ is a group expressed by the formula F—(CFCF$_3$—CF$_2$—O)$_{12}$CFCF$_3$—. These fluorine-containing organopolysiloxanes (b1) can be prepared by a method known in the art of silicones.

The component (b) of the second class, i.e. component (b2), is a cyclic organopolysiloxane represented by the general formula (III) given above, in which Rf and Y each have the same meaning as defined for the general formula (II), each $R^2$ is an alkyl group having 1 to 4 carbon atoms, i.e. methyl, ethyl, propyl and butyl groups, or an aryl group, e.g., phenyl and tolyl groups, and the subscript e is a positive integer of 2 or larger or, preferably, in the range from 2 to 6 or, more preferably, 2 or 3. Examples of the cyclic organopolysiloxane suitable as the component (b2) include, though not particularly limitative thereto, those expressed by the following structural formulas, in which Me is a methyl group

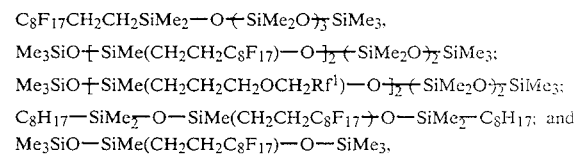

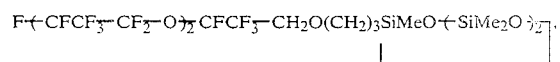

 and

These fluorine-containing cyclic organopolysiloxane oligomers (b2) can be prepared according to the procedure disclosed in U.S. Pat. No. 4,898,958. Alternatively, they can be prepared by the method of cohydrolysis of a fluorine-containing hydrolyzable silane compound and a hydrolyzable alkyl or aryl silane compound or by the method of the hydrosilation reaction between an SiH-containing cyclic organosiloxane oligomer and a fluorine-containing olefin compound.

The component (b) of the third class, i.e. component (b3), is a tris(siloxy) organosilane compound represented by the general formula (IV) given above, in which Me is a methyl group, Rf and $R^1$ each have the same meaning as defined above, X is a hydrogen atom or a fluorine atom and the subscript f is zero or 1. Examples of the fluorine-containing tris(siloxy) silane compound belonging to this class include those expressed by the following structural formulas: $C_8F_{17}CH_2CH_2Si(OSiMe_2C_8H_{17})_3$, $C_8F_{17}CH_2CH_2Si(OSiMe_3)_3$ and $C_8F_{17}CH_2CH_2Si(OSiMe_2C_{10}H_{21})_3$. These compounds can be prepared according to the method disclosed in Japanese Patent Kokai 3-251589.

Further, the component (b) of the fourth class, i.e. component (b4), is an oxyalkylene group-containing organopolysiloxane compound represented by the general formula (V) given above, in which Rf, X, f and Me each have the same meaning as defined above, $R^3$ is a hydrogen atom, an alkyl group having 1 to 4 carbon atoms or an acyl group having 2 or 3 carbon atoms, Q is a polyoxyalkylene group and the subscript m is 1, 2 or 3. The polyoxyalkylene group is exemplified by polyoxyethylene and polyoxypropylene groups expressed by the formulas: $-(OCH_2CH_2CH_2)_{\overline{u}}$; $-(OCH_2CH_2)_{\overline{u}}$ and $-(OCH_2CHMe)_{\overline{u}}$, in which Me is a methyl group and the subscript u is a positive integer, as well as combinations of these unit structures. The value of the subscript u does not exceed, preferably, 20 or, more preferably, 10 so that the polyoxyalkylene group denoted by Q has, preferably, 2 to 60 carbon atoms or, more preferably, 2 to 30 carbon atoms. Particular examples of the organopolysiloxane belonging to this class of organopolysiloxane (b4) include, though not particularly limitative thereto, those expressed by the following structural formulas:

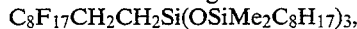

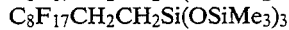

$Rf^2—SiMe[O—SiMe_2(CH_2)_{\overline{3}}(OCH_2CH_2)_{\overline{5}}(OCH_2CHMe)_{\overline{5}}OH]_2,$ in which Me is a methyl group, $Rf^2$ is 2-(perfluorooctyl)ethyl group and $Rf^3$ is a group of the formula $$F(CFCF_3—CF_2—O)_{\overline{2}}CFCF_3—CH_2—O—CH_2—.$$

These organopolysiloxanes (b4) can be synthetically prepared by the method disclosed, for example, in Japanese Patent Kokai 3-47190 and 4-99780.

The organopolysiloxane composition of the present invention can be obtained by admixing 100 parts by weight of the first organopolysiloxane as the component (a) with from 0.5 to 50 parts by weight or, preferably, from 1 to 20 parts by weight of the second organopolysiloxane as the component (b) which is either one or a combination of two kinds or more of the organopolysiloxanes belonging to the classes (b1), (b2), (b3) and (b4). When the amount of the component (b) is too small, the desired effect of improvement in the wettability or spreadability of the composition can be obtained only insufficiently while no particular additional advantages can be obtained by increasing the amount of the component (b) to exceed the above mentioned upper limit rather with an economical disadvantage or a trouble of phase separation due to the poor compatibility between the components (a) and (b) although the composition is fully usable even when it is slightly turbid due to eventual phase separation of the ingredients to some extent. It is of course optional that the organopolysiloxane composition of the present invention is further admixed with various kinds of known additives such as curing agents, adhesion aids, antifoam agents, surface active agents, dispersion improvers, pigments and the like according to need each in a limited amount not to cause an adverse influence on the desired advantages to be obtained by the present invention.

The organopolysiloxane composition of the present invention obtained in the above described manner has a very low surface tension of, usually, 20 dyn/cm or smaller at 25° C. and exhibits excellent surface releasability and water resistance even though the decrease in the surface tension is not so remarkable by the admixture of the component (b) to the component (a).

In the following, the organopolysiloxane composition of the present invention is illustrated in more detail by way of examples and comparative examples, in which the value of the surface tension was obtained by using a Wilhelmy's surface balance (Model A3, manufactured by Kyowa Kaimen Kagaku Co.) at 25° C. by using a 10 g portion of the sample composition and the spreadability of the composition was evaluated by the visual inspection for the condition of the surface of a 5 cm by 2 cm wide film of a copolymeric resin of tetrafluoroethylene and a perfluoroalkyl vinyl ether coated with the sample oil to record the results as good for uniform coating and poor for the surface condition with unevenness of or repellency against coating.

EXAMPLE 1

A clear liquid organopolysiloxane composition was prepared by admixing 100 parts by weight of a dimethylpolysiloxane fluid having a viscosity of 100 centistokes at 25° C. (KF 96, a product by Shin-Etsu Chemical Co.) with 11 parts by weight of a fluorine-containing organopolysiloxane of the formula

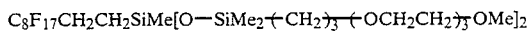

followed by agitation for 10 minutes.

The surface tension of the composition was 20.2 dyn/cm at 25° C. and the spreadability was good while the dimethylpolysiloxane as such having a surface tension of 20.1 dyn/cm exhibited poor spreadability.

EXAMPLE 2

The formulation of the organopolysiloxane composition was the same as in Example 1 except that the fluorine-containing organopolysiloxane was replaced with the same amount of another fluorine-containing organopolysiloxane expressed by the formula

The surface tension of the composition was 20.2 dyn/cm at 25° C. and the spreadability was good.

EXAMPLE 3

The formulation of the organopolysiloxane composition was the same as in Example 1 except that the fluorine-containing organopolysiloxane was replaced with the same amount of another fluorine-containing organopolysiloxane expressed by the formula

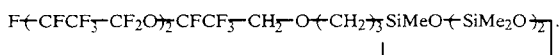

The surface tension of the composition was 17.1 dyn/cm at 25° C. and the spreadability was good.

EXAMPLE 4

The formulation of the organopolysiloxane composition was the same as in Example 1 except that the fluorine-containing organopolysiloxane was replaced with the same amount of another fluorine-containing organopolysiloxane expressed by the formula $C_8F_{17}CH_2CH_2SiMe(OSiMe_3)_2$ The surface tension of the composition was 19.7 dyn/cm at 25° C. and the spreadability was good.

EXAMPLE 5

The formulation of the organopolysiloxane composition was the same as in Example 1 except that the fluorine-containing organopolysiloxane was replaced with the same amount of another fluorine-containing organopolysiloxane expressed by the average formula

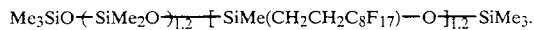

The surface tension of the composition was 19.8 dyn/cm at 25° C. and the spreadability was good.

EXAMPLE 6

An organopolysiloxane composition was prepared by admixing 100 parts by weight of the same dimethylpolysiloxane as used in Example 1 with 0.5 part by weight of a fluorine-containing linear diorganopolysiloxane expressed by the formula

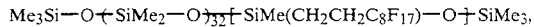

in which Me is a methyl group.

The surface tension of the composition was 20.5 dyn/cm at 25° C. and the spreadability was good.

COMPARATIVE EXAMPLE 1

The formulation of the organopolysiloxane composition was substantially the same as in Example 6 excepting decrease of the fluorine-containing diorganopolysiloxane from 0.5 part by weight to 0.1 part by weight.

The result of the spreadability test was poor although the surface tension of the composition was about the same as in Example 6.

COMPARATIVE EXAMPLE 2

The formulation of the organopolysiloxane composition was the same as in Example 1 except that the fluorine-containing organopolysiloxane was replaced with the same amount of a fluorine-containing surface active agent having a structure expressed by the formula

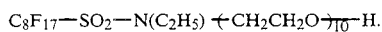

The surface tension of the composition was 20.2 dyn/cm at 25° C. but the spreadability was poor.

What is claimed is:

1. An organopolysiloxane composition which comprises, as a blend:
  (a) 100 parts by weight of a first organopolysiloxane which is a diorganopolysiloxane represented by the general formula

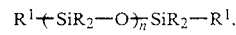

in which R is a hydrogen atom or a monovalent hydrocarbon group having 1 to 10 carbon atoms, $R^1$ is a hydroxy group or the same group as R and the subscript n is a positive integer, and having a viscosity not exceeding 100,000 centistokes at 25° C.; and
  (b) from 0.5 to 50 parts by weight of a second organopolysiloxane selected from the group consisting of:
    (b1) a linear diorganopolysiloxane represented by the general formula

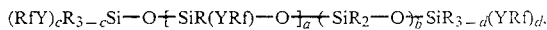

in which Rf is a perfluoroalkyl group of 1 to 14 carbon atoms or an etherified perfluoroalkyl group of 2 to 14 carbon atoms having at least one oxygen atom between two carbon atoms forming an ether linkage, R has the same meaning as defined above, Y is a divalent organic group having 2 to 5 carbon atoms, the subscripts a and b are, each independently from the other, zero or a positive integer and the subscripts c and d are, each independently from the other, zero, 1, 2 or 3 with the proviso that at least one of the subscripts a, c and d is not zero;
    (b2) a cyclic diorganopolysiloxane represented by the general formula

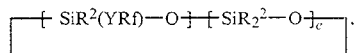

in which Rf and Y each have the same meaning as defined above, each $R^2$ is, independently from the others, an alkyl group having 1 to 4 carbon atoms or an aryl group and the subscript e is a positive integer of 2 or larger;
    (b3) a tris(siloxy) silane compound represented by the general formula

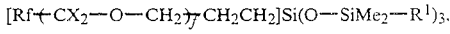

in which Rf and $R^1$ each have the same meaning as defined above, Me is a methyl group, X is a hydrogen atom or a fluorine atom and the subscript f is zero or 1; and
    (b4) an oxyalkylene group-containing organopolysiloxane represented by the general formula

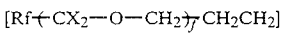
    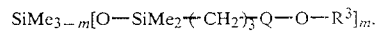

in which Rf, X, f and Me each have the same meaning as defined above, $R^3$ is a hydrogen atom, an alkyl group having 1 to 4 carbon atoms or an acyl group having 2 or 3 carbon atoms, Q is a (poly)oxyalkylene group and the subscript m is 1, 2 or 3.

2. The organopolysiloxane composition as claimed in claim 1 in which the amount of the component (b) is in the range from 1 to 20 parts by weight per 100 parts by weight of the component (a).

3. The organopolysiloxane composition as claimed in claim 1 in which the monovalent hydrocarbon group denoted by R is a methyl group.

4. The organopolysiloxane composition as claimed in claim 1 in which the organopolysiloxane as the component (b1) contains at least 10% by weight of fluorine.

* * * * *